United States Patent
Migdal-Steinberg et al.

(10) Patent No.: US 8,706,891 B2
(45) Date of Patent: Apr. 22, 2014

(54) METHOD AND COMMUNICATION DEVICE FOR TRANSMITTING PACKET-ORIENTED INFORMATION

(75) Inventors: Yifat Migdal-Steinberg, Tel-Mond (IL); Yaron Nachman, Petah-Tikva (IL)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 514 days.

(21) Appl. No.: 11/997,893

(22) PCT Filed: Jul. 31, 2006

(86) PCT No.: PCT/EP2006/064852
§ 371 (c)(1),
(2), (4) Date: Apr. 16, 2008

(87) PCT Pub. No.: WO2007/014937
PCT Pub. Date: Feb. 8, 2007

(65) Prior Publication Data
US 2008/0209058 A1 Aug. 28, 2008

(30) Foreign Application Priority Data
Aug. 3, 2005 (EP) .................................. 05016881

(51) Int. Cl.
*G06F 15/16* (2006.01)
(52) U.S. Cl.
USPC ...................................................... 709/230
(58) Field of Classification Search
USPC ...................................................... 709/230
See application file for complete search history.

(56) References Cited

U.S. PATENT DOCUMENTS

| | | | |
|---|---|---|---|
| 5,425,028 A | 6/1995 | Britton et al. | |
| 7,764,692 B1 * | 7/2010 | Bhatnagar et al. | 370/392 |
| 2004/0001478 A1 | 1/2004 | Wong | |
| 2005/0021874 A1 * | 1/2005 | Georgiou et al. | 709/250 |
| 2005/0147114 A1 * | 7/2005 | Stewart et al. | 370/432 |
| 2007/0022479 A1 * | 1/2007 | Sikdar et al. | 726/22 |
| 2011/0281589 A1 * | 11/2011 | De Beer | 455/445 |

FOREIGN PATENT DOCUMENTS

| | | | |
|---|---|---|---|
| JP | 2003105823 A | 4/2003 | |
| JP | 2004312564 A | 11/2004 | |

* cited by examiner

*Primary Examiner* — Shripal Khajuria
(74) *Attorney, Agent, or Firm* — Laurence A. Greenberg; Werner H. Stemer; Ralph E. Locher

(57) ABSTRACT

A communication network (PKN) fashioned in conformance with at least one transmission protocol is configured such that data packets (BPDU) having first address information (08 address) as protocol-specific address information are processed under the at least one transmission protocol. At least one communication device (PB) is assigned to the communication network (PKN), which communication device is fashioned in such a manner that second address information (00 address) is configured as protocol-specific address information and that data packets (BPDU) having the second address information (00 address) are processed under the at least one transmission protocol. According to the invention, in the case of data packets (PB) incoming at the communication device (PB) and containing first address information (08 address), this is replaced by the second address information (00 address) and the converted data packets (BPDU') are processed further by the communication device (PB). Advantageously, communication devices with a predetermined address configuration can be used in communication networks with different address configurations, as a result of which a cost saving is achieved.

10 Claims, 2 Drawing Sheets

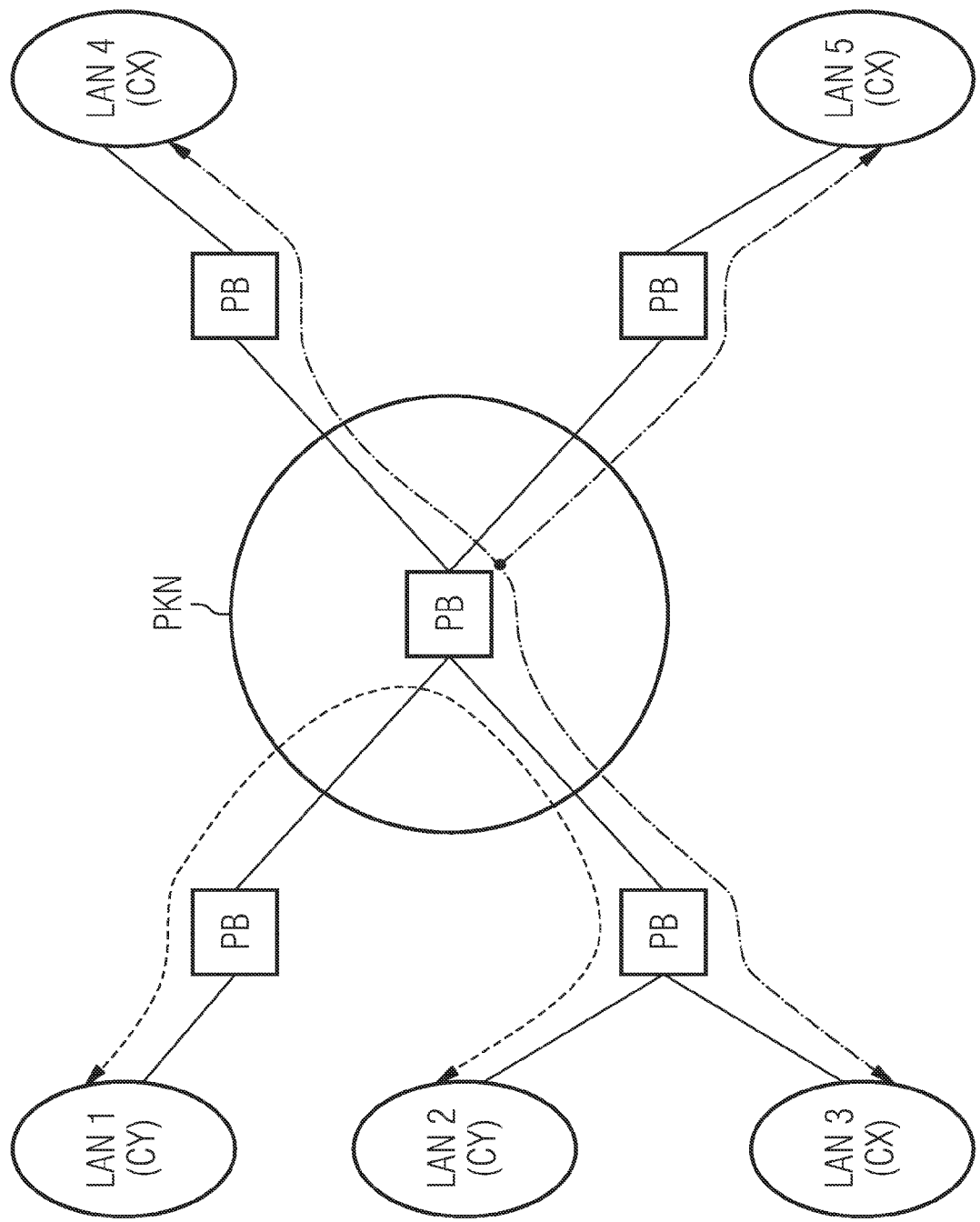

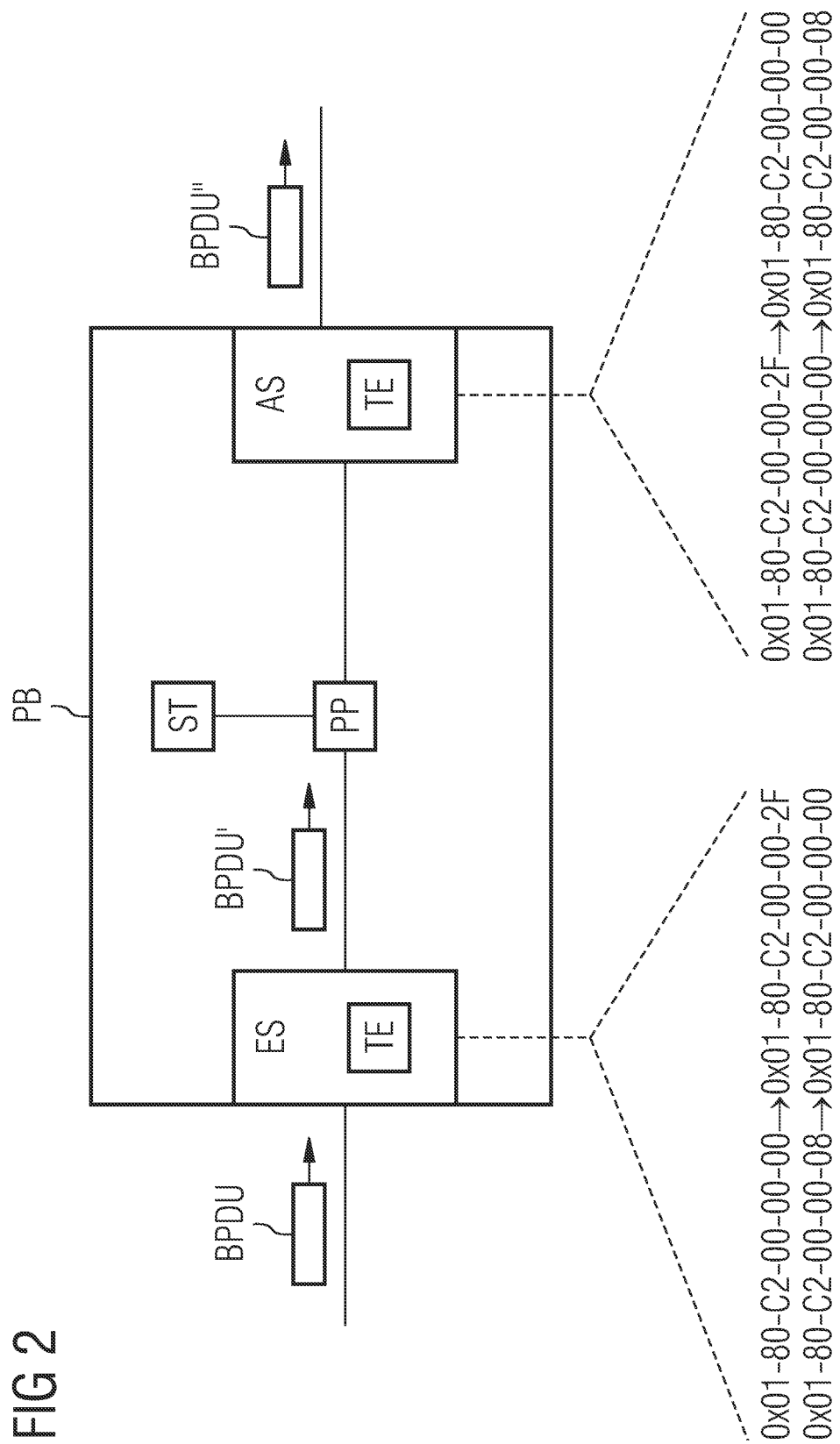

METHOD AND COMMUNICATION DEVICE FOR TRANSMITTING PACKET-ORIENTED INFORMATION

Current communication networks, i.e. both subscriber access networks (First Mile) and the associated higher-level communication networks (Second Mile) frequently implement a layer (layer 2), fashioned in conformance the Ethernet transmission method or protocol (IEEE 802.3), via which, for example, services fashioned in conformance with the Internet Protocol (IP) are realized. Communication networks of this type are also called Carrier Ethernet communication networks.

Current Carrier Ethernet communication networks frequently consist of multiple individual local communication networks or LANs which are connected to one another via bridges. Such bridges operate on the lower layer of the OSI reference model—also called the "MAC layer" (Medium Access Control)—and are thus transparent for higher protocols. The interconnection of multiple individual LANs frequently makes it possible for there to be multiple paths or routes for transmitting information between stations or communication devices. Configurations comprising multiple paths between two stations can, in the event of a fault, lead to loops and thus to data frames circulating endlessly. From the possible paths, a single path therefore has to be selected. The aim is a "tree", a configuration in which only one path from a destination point to each endpoint is stipulated. Reconfiguration, in which one of the other possible paths is stipulated, takes place only in the event of a fault. In order to find an appropriate tree, there are appropriate protocols such as, for example, the spanning tree protocol or TPC. Under the TPC, the various paths are weighted and the best, cheapest or fastest path is selected. During configuration of the tree, the individual communication devices and bridges communicate with one another by means of special data packets or Bridge Protocol Data Units (BPDUs).

Frequently, a customer's communication network consists of multiple individual LANs—also called Customer LANs—which are connected to one another via a higher-level communication network or provider communication network. FIG. 1 shows by way of example a current arrangement scenario, wherein a first and second local communication network LAN1, LAN2 are assigned to a first customer CY, and a third fourth and fifth local communication network LAN3, LAN4, LAN5 are assigned to a second customer CX. All the specified local communication networks LAN1 ... 5 are connected via bridges—also called a customer bridge, not shown—to a higher-level provider's communication network PKN. In the higher-level provider's communication network PKN, bridges PB—also called provider bridges—are also provided for coupling or connecting the individual local networks.

As part of the execution of the spanning tree protocol STP, the BPDUs (Bridge Protocol Data Units) between the respective local area networks have to be exchanged, with transportation taking place over the provider communication network PKN—see dotted and dashed lines. Previously, under the spanning tree protocol, a defined multicast address, here 0x01-80-c2-00-00-00 (also called the 00 address) was used for addressing the individual bridges. With the advances in the definition of the provider-bridge concept, the 00 address was increasingly reserved for the addressing of customer bridges. For the addressing of provider bridges under the spanning tree protocol a new address, here 0x01-80-c2-00-00-08 (also called the 08 address) was introduced and reserved accordingly.

The BPDUs emitted by customer LANs as part of the STP and containing 00 addresses have to be transported as part of the provider bridge concept transparently over the higher-level provider communication network. Functionally, no difference can be seen between customer bridges and provider bridges, i.e. the customer bridges used in customer LANs can also be used as provider bridges in higher-level provider communication networks. The previously mentioned introduction of a new address (i.e. of the 08 address) does not, however, make it possible also to use the customer bridges which were previously used in customer LANs and are configured to recognize the 00 address in provider communication networks, since provider bridges used in provider communication networks have to be configured to recognize the 08 address. If current customer bridges were nonetheless used in higher-level communication networks as provider bridges, these would detect and process further incoming BPDUs containing 00 addresses rather than forwarding them transparently over the provider communication network to local LANs connected thereto. Furthermore, provider bridges of this type would not detect incoming BPDUs containing 08 addresses, which would result in defective configurations under the STP.

The object of the invention is to enable the use of customer bridges in higher-level provider communication networks. The object is achieved in the features of claim 1.

Under the inventive method for transmitting packet-oriented information over at least one communication network fashioned in conformance with at least one transmission protocol, the communication network is configured such that data packets having first address information as protocol-specific address information are processed under the at least one transmission protocol. At least one communication device is assigned to the communication network, which communication device is fashioned in such a manner that second address information is configured as protocol-specific address information and that data packets having the second address information are processed under the at least one transmission protocol. In the case of data packets containing first address information arriving at the communication device, this first address information is replaced by the second address information and the converted data packets processed further by the communication device.

The key advantage of the method according to the invention is that customer bridges previously used in customer LANs can also be used as provider bridges within higher-level provider communication networks, as a result of which a cost saving is achieved.

Further advantageous embodiments of the method according to the invention a communication device will emerge from the further claims.

The method according to the invention is explained in more detail below with reference to several drawings, in which:

FIG. 1 shows a network scenario comprising multiple local networks in a distributed arrangement, said local networks being connected to one another via a higher-level provider communication network, and FIG. 2 shows the schematic representation of a conventional customer bridge which is used in the framework of the inventive method as a provider bridge.

FIG. 1 shows in a block diagram the exemplary arrangement scenario already explained in the introduction to the description hereinabove, comprising several independent local communication networks or LANs LAN1 ... 5—hereinafter also called customer LANs—which are connected to a higher-level provider communication network PKN. For the details comments hereinbelow, it is assumed that the first and second communication network LAN1,2 is assigned to a first customer CY, and the third, fourth and fifth local communication network LAN3,4,5 is assigned to a second customer CX. All the local communication networks LAN1 ... 5 are connected via provider bridges to the provider communication network. Under the spanning tree protocol, the BPDUs of all an operator's local communication networks have to be exchanged, i.e. the BPDUs of LAN1 and LAN2, for example, which are both assigned to the operator XY, have to be exchanged over the provider communication network PKN. Furthermore, the BPDUs of LAN3, LAN4 and LAN5, which are assigned to the operator CX, also have to be transmitted over the provider communication network. In addition, the provider communication network PKN must also itself be configured under the spanning tree protocol, i.e. the relevant BPDUs must be exchanged between the provider bridges PB.

For the further detailed comments, it is assumed that customer bridges which are configured with the 00 address are also used as provider bridges PB.

The schematic layout of such a provider bridge PB is shown in FIG. 2. There are arranged in the provider bridge PB a packet processor PP for processing the incoming data packets or BPDUs and a control device ST assigned to the packet processor PP. According to the invention, the packet processor PP is connected to an input stage ES and to an output stage AS.

A conversion unit TE, by means of which the method according to the invention is implemented, is arranged both in the input stage ES and in the output stage AS.

The use of a customer bridge as a provider bridge allows data packets or BPDUs incoming at the input stage ES and containing a 00 address (0x01-80-C2-00-00-00) to be detected not as STP-specific information and correspondingly to be processed further. Rather, incoming data packets or BPDUs containing a 08 address (0x01-80-C2-00-00-08) should be detected as an STP-specific address and processed further accordingly. The problem is that customer bridges are configured for detecting incoming BPDUs containing a 00 address.

In order to enable previous customer bridges additionally to be used as provider bridges, an appropriate conversion unit TE is provided according to the invention both in the input stage ES and in the output stage AS. Under the method according to the invention, in incoming BPDUs containing a 00 address, this 00 address is replaced by a further address, e.g. by the address 0x01-80-C2-00-00-2F (hereinafter also called the 2F address). Under the IEEE standard 802.3, the 2F address is deemed to be a reserved address which is not, however, currently in use. Replacing the 00 address with the 2F address ensures that the now converted BPDU—labeled BPDU' in FIG. 2—is not detected as an STP-specific BPDU in the provider bridge PD, i.e. by the packet processor PP arranged therein and is consequently forwarded transparently to the output stage AS. In the output stage AS, or by means of the conversion unit TE arranged in the output stage AS, the 2F address contained in the forwarded BPDU is again replaced by the 00 address, and the converted BPDU—labeled BPDU'' in FIG. 2—is then switched further.

Furthermore, the input stage ES, or the conversion unit TE arranged in the input stage ES, is fashioned such that in the case of incoming BPDUs containing a 08 address, this 08 address is replaced by the 00 address. This conversion ensures that the now converted BPDU (BPDU') is detected by the provider bridge as STP-specific information and is accordingly processed further by the packet processor PP. The further-processed BPDU is then forwarded to the output stage AS, the 00 address contained in the BPDU again being replaced by the 08 address by means of the conversion unit TE arranged there.

The STP functions are not affected or altered by the method according to the invention. Only a change or conversion of the addresses takes place. Advantageously, the functions of the packet processor PP and of the associated control unit ST remain unchanged.

By means of the method according to the invention, customer bridges previously used in customer LANs can also be used as provider bridges. Only slight modifications are required for this—e.g. minor changes in one of the FPGA chips—so that the economic cost of implementing the method according to the invention is minimal. By means of these modifications, a bridge can be used both as a customer bridge and as a provider bridge, as a result of which cost savings can be made when setting up or configuring communication networks.

The invention claimed is:

1. A method for transmitting packet-oriented information over at least one communication network fashioned in conformance with at least one transmission protocol, the method which comprises:
    processing, in the communication network, under the at least one transmission protocol, data packets having a first address which is a protocol-specific address addressing provider bridges;
    assigning at least one communication device to the communication network;
    configuring, in the communication device, a second address as a protocol-specific address addressing customer bridges;
    processing, under the at least one transmission protocol, the data packets having the second address; and
    in the case of data packets incoming at the communication device and containing the first address, replacing this first address by the second address, and processing the data packets with the just inserted second address further by the communication device under the at least one transmission protocol.

2. The method according to claim 1, characterized in that in the case of data packets, incoming at the communication device and containing the second address, this is replaced by a further address.

3. The method according to claims 2, characterized in that
    in the case of data packets to be forwarded by the communication device over the at least one communication network and containing the second address, this is replaced by the first address, and
    in the case of data packets to be forwarded by the communication device over the communication network and containing the further address, this is replaced by the second address,
    the converted data packets are forwarded over the communication network.

4. The method according to claim 1, characterized in that the at least one communication network is fashioned as a local communication network.

5. The method according to claim 1, characterized in that the at least one communication network is fashioned in conformance with the IEEE 802.3 standard.

6. The method according to claim 1, characterized in that the at least one transmission protocol is fashioned as a spanning tree protocol.

7. A communication device for transmitting packet-oriented information over at least one communication network which is connectable thereto and which is fashioned in conformance with at least one transmission protocol, the at least one communication network being configured such that data packets having the first address as the protocol-specific address addressing provider bridges are processed under the at least one transmission protocol, wherein, in the communication device, a second address is configured as a protocol-specific address addressing customer bridges and data packets having the second address are processed under the at least one transmission protocol with conversion means, by which data packets incoming at the communication device and containing the first address have said first address replaced by the second address, the data packets with the just inserted second address being processed further by the communication device under the at least one transmission protocol.

8. The communication device according to claim 7, characterized in that the conversion means are fashioned such that in the case of data packets incoming at the communication device and containing said second address, this is replaced by a further address.

9. The communication device according to claim 8, characterized in that further conversion means are provided, by means of which, in the case of data packets to be forwarded by the communication device over the at least one communication network and containing said second address, this is replaced by the first address, and in the case of data packets to be forwarded by the communication device over the communication network and containing said further address, this is replaced by the second address.

10. The communication device according to claim 7, characterized in that the communication device is fashioned as a bridge.

\* \* \* \* \*